(12) United States Patent
Tanke et al.

(10) Patent No.: US 10,731,708 B2
(45) Date of Patent: Aug. 4, 2020

(54) BEARING

(71) Applicant: Aktiebolaget SKF, Gothenburg (SE)

(72) Inventors: Jesko-Henning Tanke, Schweinfurt (DE); Christian Kogler, Oberkurzheim (AT); Holger Kristandt, Euerbach (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/283,943

(22) Filed: Feb. 25, 2019

(65) Prior Publication Data

US 2019/0264747 A1  Aug. 29, 2019

(30) Foreign Application Priority Data

Feb. 28, 2018  (DE) .................. 10 2018 202 993

(51) Int. Cl.
| | | |
|---|---|---|
| *F16C 43/04* | (2006.01) | |
| *F16C 19/38* | (2006.01) | |
| *F16C 33/76* | (2006.01) | |
| *F16C 33/58* | (2006.01) | |
| *F16C 33/60* | (2006.01) | |
| *F16C 33/78* | (2006.01) | |

(52) U.S. Cl.
CPC .......... *F16C 43/045* (2013.01); *F16C 19/38* (2013.01); *F16C 33/585* (2013.01); *F16C 33/60* (2013.01); *F16C 33/768* (2013.01); *F16C 33/7823* (2013.01); *F16C 19/386* (2013.01); *F16C 2202/08* (2013.01)

(58) Field of Classification Search
CPC ...... F16C 19/386; F16C 33/60; F16C 33/585; F16C 33/768; F16C 33/7823; F16C 33/6607; F16C 33/664; F16C 33/6659; F16C 43/045; F16C 2202/08; F16C 19/38; F16C 19/385

USPC ....... 384/477, 484–486, 489, 506, 551, 571; 277/401–402, 612, 614, 619, 644, 648

See application file for complete search history.

(56) References Cited

U.S. PATENT DOCUMENTS

| | | | | |
|---|---|---|---|---|
| 2,841,429 A | * | 7/1958 | McCuistion | ......... F16J 15/3236 277/402 |
| 3,831,950 A | * | 8/1974 | Bentley | ................ F16J 15/3236 277/649 |
| 4,798,482 A | * | 1/1989 | Kruk | ..................... F16C 19/542 384/571 |
| 5,118,206 A | * | 6/1992 | Otto | ...................... F16C 19/385 384/477 |

(Continued)

FOREIGN PATENT DOCUMENTS

| | | |
|---|---|---|
| DE | 4222852 A1 | 1/1994 |
| DE | 19935014 A1 | 2/2000 |

(Continued)

*Primary Examiner* — Marcus Charles
(74) *Attorney, Agent, or Firm* — J-Tek Law PLLC; Scott T. Wakeman; Mark A. Ussai

(57) ABSTRACT

A bearing includes a first ring, a second ring and a plurality of rolling elements between the first and second rings. The first ring is a split ring formed of a first ring part and a second ring part that meet at a joint region, and each of the ring parts includes a recess that extends axially into the respective ring part from the joint region. A cylindrical seal is disposed in the recess of the first ring part and extends across the joint into the recess of the second ring part.

20 Claims, 4 Drawing Sheets

(56) References Cited

U.S. PATENT DOCUMENTS

| | | | | | |
|---|---|---|---|---|---|
| 5,213,342 | A | * | 5/1993 | Weber | F16C 33/768 |
| | | | | | 267/1.5 |
| 5,492,419 | A | * | 2/1996 | Miller | F16C 19/386 |
| | | | | | 384/551 |
| 5,653,452 | A | * | 8/1997 | Jarvenkyla | F16L 47/08 |
| | | | | | 277/607 |
| 6,457,870 | B2 | * | 10/2002 | Aizawa | F16C 19/388 |
| | | | | | 384/477 |
| 6,843,480 | B2 | * | 1/2005 | Nelson | E21B 33/1208 |
| | | | | | 277/338 |
| 7,066,927 | B2 | * | 6/2006 | Chen | A61B 17/1646 |
| | | | | | 137/625.69 |
| 7,959,159 | B2 | * | 6/2011 | Hocker | F02M 59/442 |
| | | | | | 277/559 |
| 8,226,298 | B2 | * | 7/2012 | Hosaka | F16C 19/388 |
| | | | | | 384/477 |
| 8,764,305 | B2 | * | 7/2014 | Henneberger | B60B 27/00 |
| | | | | | 384/551 |
| 8,894,072 | B2 | * | 11/2014 | Wolf | E02D 5/14 |
| | | | | | 277/642 |
| 9,103,375 | B2 | * | 8/2015 | Seufert | F16C 33/6659 |
| 2009/0190874 | A1 | * | 7/2009 | Burner | F16C 19/386 |
| | | | | | 384/480 |

FOREIGN PATENT DOCUMENTS

| | | | | |
|---|---|---|---|---|
| DE | 102014208232 A1 | | 11/2015 | |
| JP | 2005061433 A | * | 3/2005 | F16C 33/60 |
| JP | 2013068275 A | * | 4/2013 | F16C 19/386 |

\* cited by examiner

BEARING

CROSS-REFERENCE

This application claims priority to German patent application no. 10 2018 202 993.8 filed on Feb. 28, 2018, the contents of which are fully incorporated herein by reference.

TECHNOLOGICAL FIELD

The present disclosure is directed to a bearing including a first ring, a second ring, and rolling elements disposed between the rings where the first ring is a split ring including a first ring part and a second ring part.

BACKGROUND

Bearings that include a split ring require a seal between the parts of this ring in order to prevent the escape of lubricant from the bearing and the entry of contaminants into the bearing. For this purpose a seal, for example, an O-ring, can be disposed between the parts of the split ring. However, due to the arrangement of the seal between the bearing ring parts the O-ring can shift, whereby the seal effect can diminish. Furthermore, with particularly narrow bearings there is little space between the rows, with the result that the arrangement of such an O-ring is complicated or even impossible.

SUMMARY

It is therefore an aspect of the present disclosure to provide a bearing wherein a sealing of the bearing is possible in an improved manner.

The first ring, which can be both an inner ring and an outer ring, is a split ring including a first ring part and a second ring part, wherein an annular seal is disposed in a joint region between the first ring part and the second ring part.

In order to ensure a good sealing of the bearing, according to the present disclosure the first ring part and the second ring part of the split ring include an axially extending recess. This recess is formed by an axially extending recessed portion in the first ring part and an axially extending recessed portion in the second ring part.

Instead of an O-ring that is disposed between the first ring part and the second ring part, the annular seal is disposed in the recess. For this purpose the seal is configured cylindrical-casing-shaped and extends axially into the recessed portion of the first ring part and the recessed portion of the second ring part. The seal thus forms a flat ring that is disposed in the split ring instead of only between the parts of the ring. Due to this arrangement an improved sealing can be achieved in comparison to previous seal solutions.

According to one embodiment the seal includes a radially inwardly and/or radially outwardly projecting thickening in the joint region. For example, in addition to the recessed portions in the joint region the two ring parts can also include a countersinking into which the thickening of the seal can extend. For example, the seal can be disposed in a radial edge region of the split ring. Here the countersinking can represent an opening in the split ring, which opening is toward the rolling elements or in the opposite direction. Due to the thickening of the seal this opening is sealed radially outward.

On at least one end of its axial extension the seal can include at least one seal lip extending radially inward and/or outward. Here the radial extension can also be an oblique extension radially inward or outward. Due to these radially extending seal lips a radial supporting of the seal can be effected in the region of the recessed portions. On the one hand, due to this supporting, the seal effect can be improved. On the other hand, due to the seal lips, an insensitivity to tolerances in the recesses is achieved.

Due to the seal lips, in one embodiment at least one end of the axial extension of the seal can be designed arrow-shaped. Because of this arrow-shaped end, the seal can be inserted into the recessed portions in a simple manner because the seal lips slip along on the edge of the recessed portions. Alternatively or additionally the axial end can itself be configured pointed, which also makes possible an easier inserting.

According to a further embodiment, at least one end of the axial extension of the cylindrical-casing-shaped seal includes a seal structure including a plurality of projecting elements that extend radially inward and/or radially outward. The projecting elements can be, for example, tooth-shaped or sawtooth-shaped. Other shapes of the projecting elements are also possible. The seal structure can be disposed on one or both axial ends and can extend both radially inward and radially outward. Due to the seal structure an insensitivity to tolerances in the recessed portions is achieved in particular.

According to a further embodiment the split ring in the joint region can include at least one through-opening, which is composed of two openings located end-side in the opposing halves of the split ring, which openings have radial extension through the entire ring. The through-opening can have a cross-section that is approximately round or deviating therefrom, for example, rectangular. This through-opening can be used, for example, as access into the bearing for introducing and removing lubricants, in particular grease. An additional bore in one of the ring halves, outside the seal region, is not necessary.

According to a further embodiment the seal includes at least one radially extending through-bore that is aligned with the through-opening(s) of the split ring. This through-bore can be, for example, cylindrical or conical. This through-bore or through-opening can be used, for example, to discharge lubricant from the bearing interior, that is, from the region between the two rings through the split ring and through the seal. In this way a grease outlet can be realized in the region of the seal. The through-openings can also be used for other purposes.

In one embodiment a tubular element can be disposed in the through-opening of the split ring and the through-bore of the seal. Here the tubular element can be either cylindrical or conical. The tubular element can preferably correspond to the shape of the through-opening in the split ring and the seal. The bearing interior can be connected to the outer region of the bearing by the tubular element. Used grease can be discharged from the bearing interior by the tubular element. Alternatively the tubular element can also be used to supply grease.

The tubular element is configured to be coupled to a lubricant outlet system. The lubricant outlet system can be connected to a container in which used lubricant, in particular grease, can be collected.

Further advantages and advantageous embodiments are specified in the description, the drawings, and the claims. Here in particular the combinations of features specified in the description and in the drawings are purely exemplary, so that the features can also be present individually or combined in other ways.

In the following the invention shall be described in more detail using exemplary embodiments depicted in the drawings. Here the exemplary embodiments and the combinations shown in the exemplary embodiments are purely exemplary and are not intended to define the scope of the invention. This scope is defined solely by the claims.

DETAILED DESCRIPTION

In the following, identical or functionally equivalent elements are designated by the same reference numbers.

Figure 1:
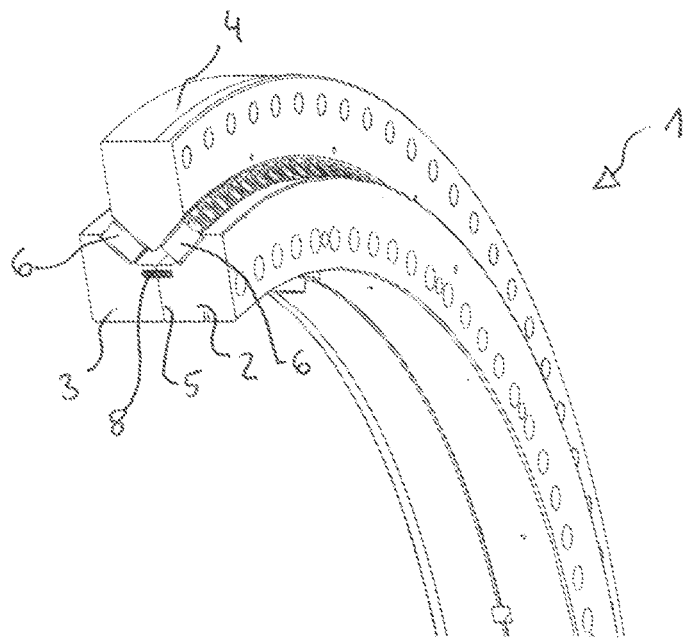
FIG. 1 is a perspective view of a segment of a bearing including a split inner ring and a seal according to the present disclosure.

FIG. 1 shows a perspective view of a segment of a bearing 1. The bearing 1 includes an inner ring 2, 3, an outer ring 4, and rolling elements 6 disposed between the rings. The bearing 1 shown is a double row tapered roller bearing including two rows of rolling elements 6 and a split inner ring 2, 3.

A radial opening 5 can be provided between the two parts 2, 3 of the inner ring, i.e., in the joint region. In order to discharge lubricant, which is located in the bearing between the rings 2, 3, 4, from the bearing interior, i.e., the space that is defined between the split inner ring 2,3 and the outer ring 4, the radial opening 5 can be connected to a lubricant outlet.

Figure 2:
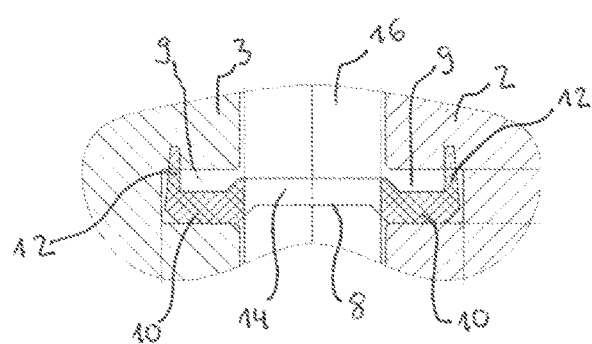
FIG. 2 is a schematic sectional view of a split ring including a seal according to the present disclosure.

As shown in FIG. 2, the joint region 5 is sealed by a seal 8 that is disposed in the joint region 5 between the two parts 2, 3 of the split inner ring. For this purpose the two parts 2, 3 of the split inner ring include respective recessed portions 9 that axially oppose each other and together form an axially extending recess.

The annular seal 8 is cylindrical-casing-shaped, wherein the axial ends of the seal 5 extend into the recessed portions 9. The seal 8 thus has the shape of a flat ring.

In order to improve the seal effect, seal lips 12 extending essentially radially can be provided on the two axial ends 10. These seal lips 12 are pressed against the inner ring 2, 3 into the recessed portions 9 and thus seal the bearing interior particularly well.

Figure 3:
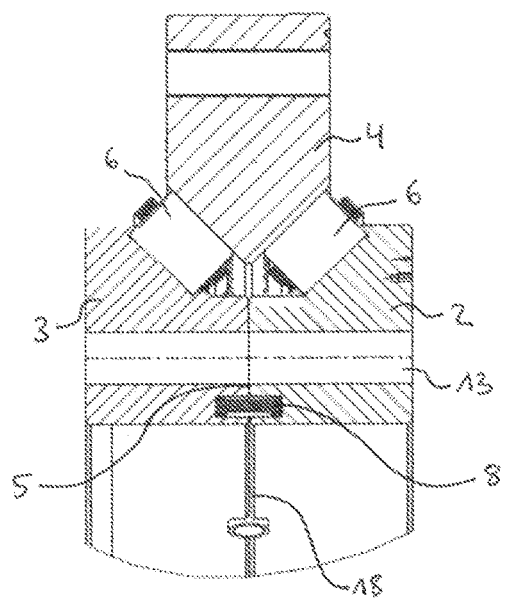
FIG. 3 is a schematic sectional view of a bearing including a split inner ring and a seal according to the present disclosure.
Figure 4:
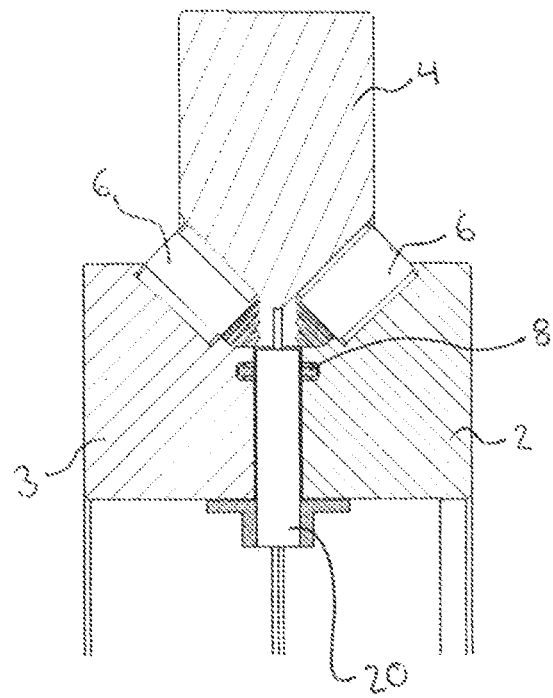
FIG. 4 is a sectional view of a split inner ring including a seal according to the present disclosure and a lubricant outlet.

The seal 8 can be disposed in the joint region 5 of the split ring, which can be either the outer ring or the inner ring. As shown in FIG. 3, the seal 8 can be provided in the split inner ring 2, 3 between the inner bore of the inner ring and an axially extending bore 13.

In this case, starting from the seal 8 a through-opening 18 can lead to the inner bore of the inner ring. Lubricants, for example, can be discharged via this through-opening 18. In order to discharge the lubricant from the bearing interior through the seal 8 and the inner ring 2, 3, both the seal 8 and the two parts 2, 3 of the inner ring include a through-opening 14, 16 as shown, for example, in FIG. 2. The through-opening 16 of the inner ring 2, 3 and the through-bore 14 of the seal 9 are aligned with each other. A plurality of such through-openings 14, 16 can be provided circumferentially.

The through-opening 16 of the inner ring 2, 3 is located in the joint region 5, so that no further additional openings need to be provided that would occupy the space available on the inner ring 2, 3. The through-opening 16 can be configured as milled out portions of the parts 2, 3 of the inner ring.

A tubular element 20 can be introduced into the through-openings 14, 16, which tubular element 20 can be connected to a lubricant outlet system. A connection, for example, of the bearing interior to the external environment of the bearing 1 can be produced in a simple manner via the tubular element 20 that extends into the inner ring 2, 3.

Figure 5:
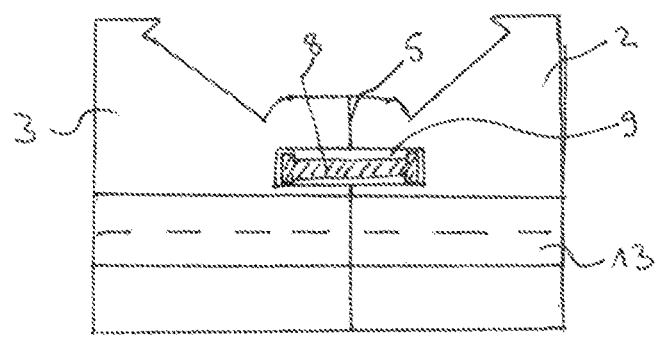
FIG. 5 is a schematic sectional view of a split ring including a seal according to the present disclosure.

Other arrangements of the seal 8 are also possible. For example, the seal 8 can be disposed between the bore 13 and the bearing interior including the rolling elements 6, as shown in FIG. 5.

Figure 6:
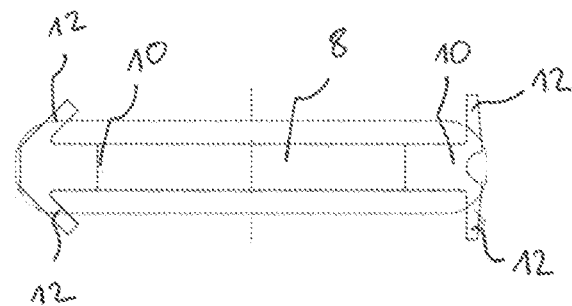
FIGS. 6-12 are schematic sectional views of embodiments of the seal of FIGS. 1 to 5.

In order to ensure the sealing of the bearing 1 by the seal 8, the seal 8 can include the radially extending seal lips 12. These can have different shapes. For example, the seal lips 12 can extend radially inward or outward, as shown in FIG. 6 on the left side. Alternatively the seal lips can also extend perpendicularly radially inward or outward, as shown in FIG. 6 on the right side. In each case the seal lips 12 are supported on the recessed portions 9 of the inner ring parts 2, 3 in order to ensure in this way the seal-tightness of the bearing 1. Furthermore, manufacturing tolerances of the recessed portions 9 can be compensated by the seal lips 12.

The seal 8 can have various shapes. As shown in FIGS. 3 and 5, the seal 8 can be configured, for example, dumbbell-shaped. Further possible designs of the seal 8 are shown in FIGS. 7 to 12.

Figure 7:
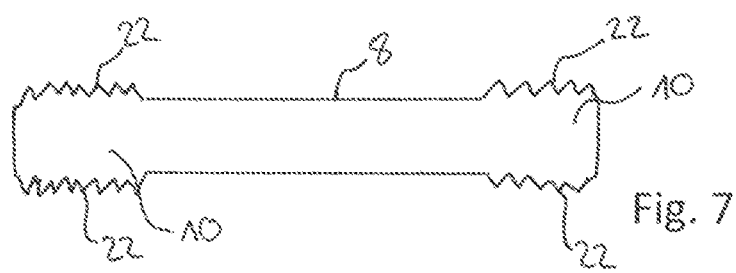

For example, the seal 8 can include a seal structure 22 on one or both ends, as shown in FIG. 7. This seal structure 22 can include a plurality of projections, which can, for example, be sawtooth-shaped. A particularly good matching of the seal 8 to the recessed portions 9 can be effected by the seal structure 22.

Figure 8:
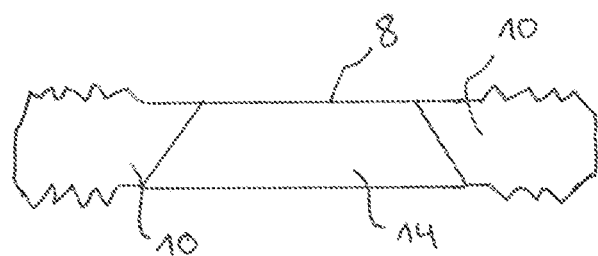

The through-bore 14 of the seal 8 can be cylindrical or conical, as shown in FIG. 8. An improved seal effect can be achieved by the conical shape. Furthermore, the tubular element 20 can be introduced more easily.

The two ends 10 of the seal 8 can be configured identically or differently to each other. Furthermore, the ends 10 can also be configured without a seal structure 22 or seal lips 12.

Figure 9:

As shown in FIG. 9, the ends 10 can be configured pointed. A simple inserting into the recessed portions 9 is ensured by the point. Further shapes and combinations are also possible.

Figure 10:
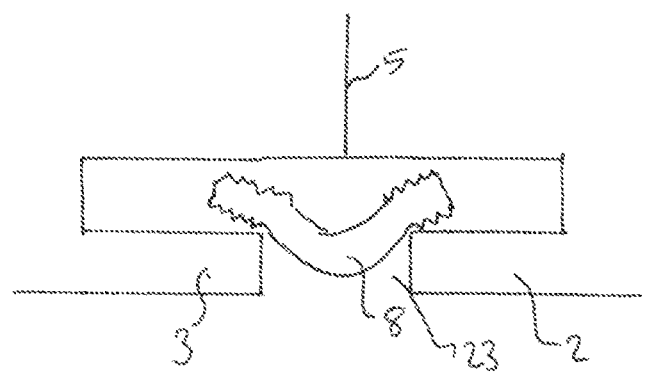
Figure 11:
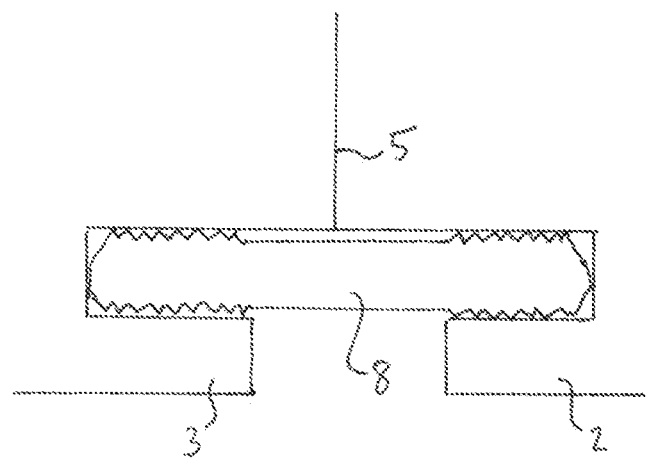
Figure 12:
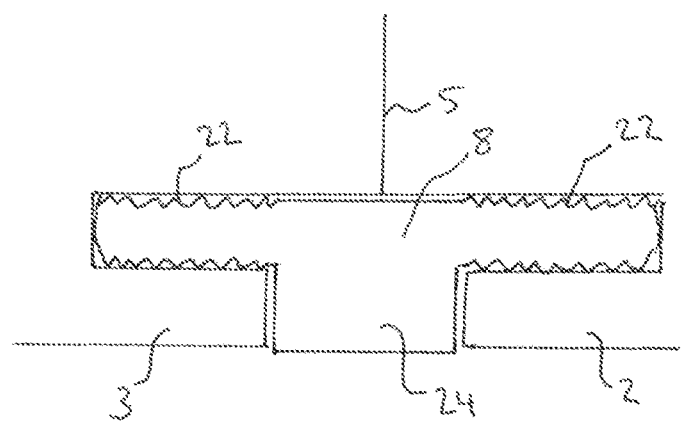

In addition to the recess 9 the two ring parts 2, 3 can include a further recess 23 that opens the ring outward, as shown in FIG. 10. Through this recess 23 the seal 8, which is elastic, can be installed and exchanged in a simple manner. After the inserting, which is shown in FIG. 10, the seal 8 extends into the recess 9.

In order to better seal the ring, the seal 9 can include a thickening 24 that projects into the recess 23. In this way a sealing closing of the ring parts 2, 3 by the seal 8 can also be achieved in the recess 23.

A split-in-two bearing ring can be sealed in a simple manner by the proposed bearing and the seal. Since the seal is not between the parts of the ring, but rather in a recess in the ring parts, the seal effect can be improved in comparison to previous solutions. In addition, an opening can be provided by the seal in order to discharge lubricant from the bearing in a simple manner.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearings and bearing rings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing
2 First part of the inner ring
3 Second part of the inner ring
4 Outer ring
5 Joint region
6 Rolling element
8 Seal
9 Recessed portion
10 Axial end
12 Seal lips
13-18 Through-opening
20 Tubular element
22 Seal structure
23 Recess
24 Thickening

What is claimed is:

1. A bearing comprising:
a first ring,
a second ring, and
a plurality of rolling elements disposed between the first ring and the second ring,
wherein the first ring comprises a split ring having a first ring part and a second ring part meeting at a joint region, the first ring part and the second ring part each including a recess extending axially into the respective ring part from the joint region, each recess having a radially inner wall defined by the respective ring part and a radially outer wall defined by the respective ring part, and
a cylindrical seal disposed in the recess of the first ring part and extending across the joint into the recess of the second ring part.

2. The bearing according to claim 1, wherein the seal includes a radially inward projecting thickening and/or a radially outwardly projecting thickening in the joint region.

3. The bearing according to claim 1, wherein the cylindrical seal has a first axial end and a second axial end and wherein at least the first axial end includes at least one seal lip extending radially inward and/or radially outward.

4. The bearing according to claim 1, wherein the cylindrical seal has a first axial end and a second axial end and wherein at least the first axial end includes a seal structure having a plurality of projecting elements that extend radially inward and/or radially outward.

5. The bearing according to claim 4, wherein the plurality of projecting elements are tooth-shaped or sawtooth-shaped.

6. The bearing according to claim 1, wherein the first ring includes at least one through-opening in the joint region.

7. The bearing according to claim 6, wherein the seal includes at least one radially extending through-bore aligned with the through-opening of the first ring.

8. The bearing according to claim 7, wherein the through-bore in the seal is cylindrical or conical.

9. The bearing according to claim 1,
wherein the seal includes a radially inward projecting thickening or a radially outwardly projecting thickening in the joint region,
wherein the cylindrical seal has a first axial end and a second axial end and wherein at least the first axial end includes at least one seal lip extending radially inward and/or radially outward,
wherein the first ring includes at least one through-opening in the joint region,
wherein the seal includes at least one radially extending cylindrical or conical through-bore aligned with the through-opening of the first ring, and
wherein a tubular element is disposed in the through-opening of the first ring and the through-bore of the seal.

10. The bearing according to claim 1,
wherein the seal includes a radially inward projecting thickening or a radially outwardly projecting thickening in the joint region,
wherein the cylindrical seal has a first axial end and a second axial end and wherein at least the first axial end includes a plurality of tooth-shaped or sawtooth-shaped projecting elements,
wherein the first ring includes at least one through-opening in the joint region,
wherein the seal includes at least one radially extending cylindrical or conical through-bore aligned with the through-opening of the first ring, and
wherein a tubular element is disposed in the through-opening of the first ring and the through-bore of the seal.

11. A bearing comprising:
a first ring,
a second ring, and
a plurality of rolling elements disposed between the first ring and the second ring,
wherein the first ring comprises a split ring having a first ring part and a second ring part meeting at a joint region, the first ring part and the second ring part each including a recess extending axially into the respective ring part from the joint region, and a cylindrical seal disposed in the recess of the first ring part and extending across the joint into the recess of the second ring part, wherein the first ring includes at least one through-opening in the joint region, wherein the seal includes at least one radially extending through-bore aligned with the through-opening of the first ring, and wherein a tubular element is disposed in the through-opening of the first ring and the through-bore of the seal.

12. The bearing according to claim 11, wherein the tubular element is configured to be coupled to a lubricant outlet system.

13. A bearing comprising:
a first ring,
a second ring, and
a plurality of rolling elements disposed between the first ring and the second ring,
wherein the first ring comprises a split ring having a first ring part and a second ring part meeting at a joint region,
wherein the first ring part has a first axial recess and the second ring part has a second axial recess axially aligned with the first recess,
wherein the joint region includes a radially inner joint region located radially inward of the first recess and a radially outer joint region located radially outward of the first recess, and
including a cylindrical seal extending from the first axial recess across the joint region into the second axial recess.

14. The bearing according to claim 13, wherein the seal includes a radially inward projecting thickening and/or a radially outwardly projecting thickening in the joint region.

15. The bearing according to claim 13, wherein the cylindrical seal has a first axial end and a second axial end and wherein at least the first axial end includes at least one seal lip extending radially inward and/or radially outward.

16. The bearing according to claim 13, wherein the cylindrical seal has a first axial end and a second axial end and wherein at least the first axial end includes a seal structure having a plurality of projections that extend radially inward and/or radially outward.

17. The bearing according to claim 16, wherein the plurality of projections are tooth-shaped or sawtooth-shaped.

18. The bearing according to claim 13, wherein the first ring includes at least one through-opening in the joint region.

19. The bearing according to claim 18, wherein the seal includes at least one radially extending through-bore aligned with the through-opening of the first ring.

20. The bearing according to claim 19, wherein a tubular element is disposed in the through-opening of the first ring and the through-bore of the seal.

* * * * *